United States Patent
Rogan

(10) Patent No.: US 10,748,295 B2
(45) Date of Patent: Aug. 18, 2020

(54) OBJECT TRACKING IN BLIND-SPOT

(71) Applicant: Ford Global Technologies, LLC, Dearborn, MI (US)

(72) Inventor: Douglas Rogan, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 162 days.

(21) Appl. No.: 16/003,765

(22) Filed: Jun. 8, 2018

(65) Prior Publication Data

US 2019/0378282 A1    Dec. 12, 2019

(51) Int. Cl.
*G06T 7/246*    (2017.01)
*B60D 1/36*    (2006.01)

(52) U.S. Cl.
CPC .............. *G06T 7/251* (2017.01); *B60D 1/36* (2013.01); *G06T 2207/30252* (2013.01)

(58) Field of Classification Search
CPC combination set(s) only.
See application file for complete search history.

(56) References Cited

U.S. PATENT DOCUMENTS

| | | |
|---|---|---|
| 6,480,104 B1 | 11/2002 | Wall et al. |
| 7,061,373 B2 | 6/2006 | Takahashi |
| 7,777,615 B2 | 8/2010 | Okuda et al. |
| 8,791,802 B2 | 7/2014 | Schwindt et al. |
| 9,760,782 B2 | 9/2017 | Augst |
| 9,767,696 B2 | 9/2017 | Arndt et al. |
| 2002/0145662 A1* | 10/2002 | Mizusawa ............... B60D 1/36 348/118 |
| 2006/0255560 A1* | 11/2006 | Dietz ..................... B60D 1/36 280/477 |
| 2008/0077882 A1* | 3/2008 | Kramer ............. G06K 9/00355 715/810 |
| 2009/0005959 A1* | 1/2009 | Bargman ........... G06K 9/00805 701/117 |
| 2010/0039515 A1* | 2/2010 | Dietz ..................... B60D 1/36 348/148 |
| 2010/0096203 A1 | 4/2010 | Freese V et al. |
| 2010/0324770 A1* | 12/2010 | Ramsey .................. B60D 1/36 701/25 |
| 2011/0216199 A1* | 9/2011 | Trevino .................. H04N 7/18 348/148 |
| 2012/0191285 A1 | 7/2012 | Woolf et al. |
| 2013/0226390 A1 | 8/2013 | Luo et al. |
| 2014/0267688 A1* | 9/2014 | Aich .................... B60W 10/04 348/113 |
| 2015/0115571 A1 | 4/2015 | Zhang et al. |
| 2016/0052548 A1* | 2/2016 | Singh ................ B62D 15/0265 701/37 |
| 2016/0101730 A1 | 4/2016 | Shehan et al. |

(Continued)

OTHER PUBLICATIONS

Non-Final Office Action dated Jun. 9, 2020 re U.S. Appl. No. 16/003,733, filed Jun. 8, 2018.

*Primary Examiner* — Cindy Trandai
(74) *Attorney, Agent, or Firm* — Frank A. MacKenzie; Bejin Bieneman PLC

(57) ABSTRACT

A system includes a processor and a memory. The memory stores instructions executable by the processor to identify an object, including points on the object, to perform tracking of the object based on a motion model including a relationship of the points to one another, and to then output a location of one of the points in a blind spot based on the tracking.

15 Claims, 4 Drawing Sheets

(56) References Cited

U.S. PATENT DOCUMENTS

| | | | |
|---|---|---|---|
| 2016/0252610 A1* | 9/2016 | Smith | G01S 13/931 |
| | | | 342/27 |
| 2016/0304122 A1* | 10/2016 | Herzog | B60W 30/09 |
| 2017/0101092 A1* | 4/2017 | Nguyen Van | B60W 30/09 |
| 2017/0123431 A1* | 5/2017 | Ghneim | B60W 10/184 |
| 2017/0151846 A1* | 6/2017 | Wuergler | B60D 1/62 |
| 2017/0185823 A1* | 6/2017 | Gold | G06K 9/00214 |
| 2017/0221359 A1 | 8/2017 | Kamata | |
| 2017/0341583 A1* | 11/2017 | Zhang | G06T 7/73 |
| 2017/0363728 A1 | 12/2017 | Prasad et al. | |
| 2018/0039278 A1* | 2/2018 | Huger | G06T 7/70 |
| 2018/0061239 A1 | 3/2018 | Prasad et al. | |
| 2018/0272941 A1* | 9/2018 | Bliss | B62D 15/0295 |
| 2018/0361929 A1* | 12/2018 | Zhang | H04N 7/181 |
| 2019/0187250 A1* | 6/2019 | Ru | G01S 7/4026 |
| 2019/0302793 A1* | 10/2019 | Leech | G05D 1/0219 |
| 2019/0340787 A1* | 11/2019 | Ramirez Llanos | B60R 1/00 |
| 2019/0347498 A1* | 11/2019 | Herman | G06K 9/00825 |
| 2019/0347825 A1* | 11/2019 | Gupta | H04N 7/183 |

\* cited by examiner

OBJECT TRACKING IN BLIND-SPOT

BACKGROUND

A vehicle computer can use data received from vehicle sensors such as radar, cameras, etc. to detect objects around the vehicle and determine locations of the detected objects. A computer in an autonomous or semi-autonomous mode may operate the vehicle based on determined locations of objects around the vehicle. However, it is a problem to operate a vehicle with respect to one or more objects in a blind spot of one or more sensors of the vehicle.

DETAILED DESCRIPTION

Introduction

Figure 1:
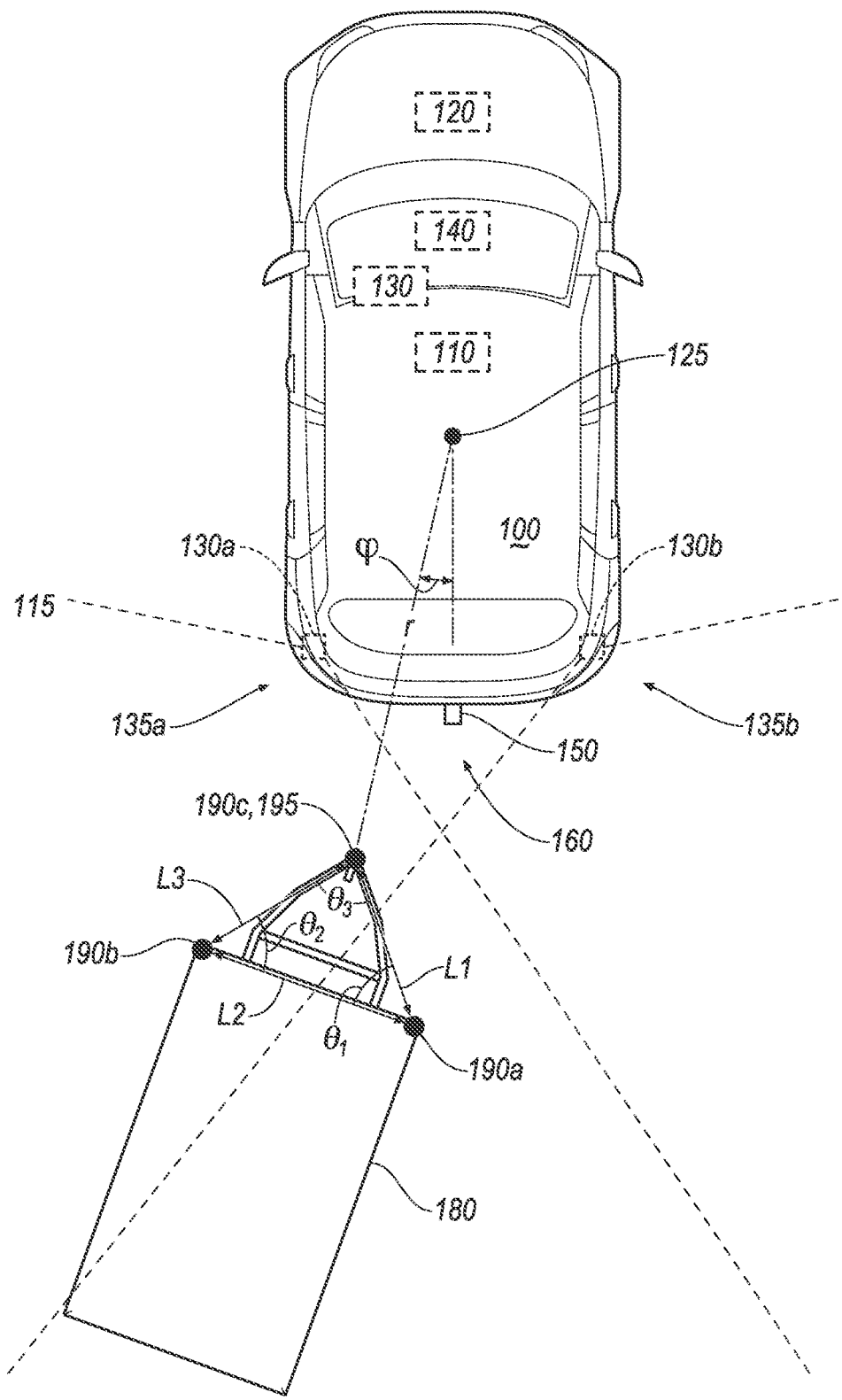
FIG. 1 is a diagram of an example vehicle and a trailer.

Disclosed herein is a system including a processor and a memory. The memory stores instructions executable by the processor to identify an object, including points on the object, to perform tracking of the object based on a motion model including a relationship of the points to one another, and to then output a location of one of the points in a blind spot based on the tracking.

The motion model may further include a dead reckoning model, based on vehicle motion data, including a second relationship of the points to a vehicle reference point.

The instructions may further include instructions to track the points of the object based on at least one of dead reckoning and vehicle object detection sensor data.

The blind spot may be a space outside fields of view of vehicle sensors.

Fields of view of one or more vehicle sensors may at least partially overlap.

The instructions further include instructions to identify three-dimensional location coordinates of each of the points relative to a reference point in a vehicle.

The instructions may further include instructions to determine the location of the one of the points in the blind spot based on the relationship of the one point in the blind spot to at least two points on the object within a field of view of one or two vehicle sensors.

The object may be a trailer including a hitch attachment, and the instructions may further include instructions to navigate a vehicle by actuating one or more vehicle actuators to move a vehicle hitch to a location of the hitch attachment of the trailer.

The instructions may further include instructions to track the points further based on physical attributes of a vehicle including a speed, heading, and steering angle.

Further disclosed herein is a method including identifying an object, including points on the object, performing tracking of the object based on a motion model including a relationship of the points to one another, and then outputting a location of one of the points in a blind spot based on the tracking.

The motion model may further include a dead reckoning model, based on vehicle motion data, including a second relationship of the points of the object relative to a vehicle reference point.

The method may further include tracking the points of the object based on at least one of dead reckoning and vehicle sensor data.

The blind spot may be a space outside fields of view of vehicle sensors.

Fields of view of one or more vehicle sensors may at least partially overlap.

Tracking the points may further include identifying three-dimensional location coordinates of each of the points relative to a reference point in a vehicle.

The method may further include determining the location of the one of the points in the blind spot based on the relationship of the one point in the blind spot to at least two points on the object within a field of view of one or two vehicle sensors.

The object may be a trailer including a hitch attachment, and the method may further include navigating a vehicle by actuating one or more vehicle actuators to move a vehicle hitch to a location of the hitch attachment of the trailer.

Further disclosed herein is a system including means for identifying an object, including points outside a vehicle blind spot, from vehicle sensor data, means for performing tracking the object based on a motion model including a relationship of the points to one another, and means for then outputting a location of one of the points in the blind spot based on the tracking.

The motion model may further include a dead reckoning model, based on vehicle motion data, including a second relationship of the points of the object relative to a vehicle reference point.

The system may further include means for determining the location of the one of the points in the blind spot based on the relationship of the one point in the blind spot to at least two points on the object within a field of view of one or two object detection sensors.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

A vehicle includes sensors providing data for object detection. A vehicle computer is programmed to identify an object including one or more points on the object that are outside a vehicle 100 blind spot 160, and to track the points, including in the blind spot, based on a motion model including a relationship of the points to one another. Further, the computer is programmed to, upon determining that at least one of the points is in the blind spot, determine a location of the point(s) in the blind spot based on the motion model and the sensor data. Thus, systems and methods disclosed herein advantageously surmount problems of tracking objects in vehicle blinds spots, e.g., to facilitate hitching a trailer to a vehicle more efficiently and safely than previously possible.

FIG. 1 illustrates a vehicle 100 and an object 180, e.g., a tow trailer. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140. The vehicle 100 has a reference point 125, e.g., a geometrical center where a longitudinal axis and a lateral axis of a vehicle 100 body intersect. The vehicle 100 may include a hitch 150 for mechanically coupling the vehicle 100 to the object 180, e.g., a trailer.

A trailer object 180 may include a body and two or more wheels. The trailer object 180 may include a conventional hitch attachment 195 for mechanically coupling to the vehicle 100 hitch 150. Additionally or alternatively, the trailer 180 may include other types of mechanical attachments such as a coupler, lock, etc., to couple the trailer 180 to the vehicle 100. Additionally or alternatively, the trailer 180 may be mechanically coupled to the vehicle 100 via a latch lever, a screw, a padlock, etc.

The computer 110 includes a processor and a memory such as are known. The memory includes one or more forms of computer-readable media, and stores instructions executable by the computer 110 for performing various operations, including as discussed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120, a sensor 130, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The sensors 130 may include a variety of devices to provide data to the computer 110. For example, the sensors 130 may include object detection sensors 130a, 130b such as Light Detection And Ranging (LIDAR) sensor(s) 130a, 130b, camera sensor(s) 130a, 130b, radar sensor(s) 130a, 130b, etc., disposed in and/or on the vehicle 100 that provide relative locations, sizes, shapes of other objects such as other vehicles. Additionally or alternatively, the vehicle 100 may include motions sensors 130 such as steering wheel sensor 130, speed sensor 130, etc. that provide one or more physical attributes of the vehicle 100 such as a steering angle, speed, etc.

As shown in FIG. 1, the vehicle 100 may include one or more object detection sensors 130a, 130b with fields of view 135a, 135b. The object detection sensors 130a, 130b may be radar, LIDAR, and/or camera sensors 130a, 130b and may be mounted to an interior and/or an exterior of the vehicle 100. When mounted to the exterior, the sensors 130a, 130b may be mounted to a rear, front, and/or a side of the vehicle 100 exterior. In the present context, a blind spot 160 is an area or, more typically, a volume outside a field of view 135a, 135b of each of the object detection sensors 130a, 130b, i.e., an area or volume from which a sensor 130 cannot obtain data. The blind spot 160 is typically a three-dimensional space, i.e., a volume. A shape or boundaries of a blind spot 160 is typically determined by one or more fields of view 135a, 135b that surround and/or abut the blind spot 160.

Respective fields of view 135a, 135b of each of one or more object detection sensors 130a, 130b may partially overlap. For example, as shown in FIG. 1, a part of the trailer object 180, e.g., a point 190a, is within an area where the fields of view 135a, 135b overlap, whereas a part of the trailer object 180, e.g., a point 190b, 190c, are within the field of view 135a and outside the field of view 135b. As the vehicle 100 and the object 180 move relative to one another, the points 190a, 190b, 190c may each be, at a given time, within one or more fields of view 135a, 135b, and/or in the blind spot 160, i.e., outside each of the fields of view 135a, 135b. In one example, the computer 110 may be programmed to determine that a point 190c is in a blind spot of the sensors 130a, 130b, upon determining that the point 190c was detected previously, e.g., 50 ms (milliseconds) ago, within at least one of the field of view 135a, 135b. Additionally, the computer 110 may be programmed to determine that the point 190c is in the blind spot 160 upon determining that based on the motion model (discussed below) the point 190c was moving toward one of the boundaries of the field of view 135a, 135b.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or outputting information to the user.

The computer 110 may be programmed to detect and/or track an object such as the trailer object 180. Tracking, in the present context, may include identifying two-dimensional or three-dimensional location coordinates of each of the points 190a, 190b, 190c of the object 180 relative to the reference point 125 in the vehicle 100. Location coordinates may be coordinates in a three-dimensional Cartesian coordinate system.

The computer 110 may be programmed to operate, including controlling a movement of, the vehicle 100, e.g., by actuating a steering, braking, and/or propulsion actuator 120 to move the vehicle 100 hitch 150 to a location of the hitch attachment 195 of the trailer object 180. In one example, the location of the hitch attachment 195 is specified by location coordinates of an end of the hitch attachment 195 spaced away from the vehicle 100. For example, the computer 110 may be programmed to navigate the vehicle 100 such that the vehicle 100 hitch 150 touches or at least vertically aligns with (i.e., the hitch 150 is substantially above or below the attachment 195) the trailer 180 hitch attachment 195. The reference point 125 coordinates may be stored in a computer 110 memory. In one example, the computer 110 may be programmed to identify a path, e.g., a curved path, from a current location of the vehicle 100 hitch to the determined location of the hitch attachment 195 and to actuate the vehicle 100 actuators 120 to navigate the vehicle 100 on the identified path to move the hitch 150 to the location of the hitch attachment 195. Thus, the computer 110 may be programmed to operate the vehicle 100 based on the location coordinates of the hitch attachment 195 and the vehicle 100 hitch 150 relative to the vehicle 100 reference point 125. However, a problem arises when the coordinates of the hitch attachment 195 are not available, e.g., because of being in the blind spot 160, and/or because the received data from the sensors 130 is unreliable, e.g., the sensors 130 provide detects another point on the trailer (e.g., because of low light conditions) and erroneously determines its coordinates to be those of the attachment 195.

The computer 110 can be programmed to identify an object 180, including points 190a, 190b, 190c outside a vehicle 100 blind spot 160, from vehicle 100 sensor 130 data, and to track the points 190a, 190b, 190c based on a motion model including a relationship of the points 190a, 190b, 190c to one another. The computer 110 can be further programmed to determine a location of one of the points 190c in the blind spot 160 based on the motion model and the sensor 130 data. In other words, although the received sensor 130 data may lack data for the point 190c which is in the blind spot 160, the computer 110 may be programmed to determine the location of the point 190c based on the model and received sensor 130 data including other points 190a, 190b of the object 180. A motion model, in the present context, means a mathematical and/or geometric expression or expressions that include (a) the relationship(s) of the location of the points 190a, 190b, 190c relative to one another, as discussed above with reference to equation (1) and (2), and (b) a model which describes a movement of the points 190a, 190b, 190c, based on a combination of data received from the vehicle 100 sensors 130 and/or dead reckoning, as discussed below.

As discussed above, the computer 110 may be programmed to receive the vehicle 100 sensor 130 data from one or more object detection sensors 130a, 130b mounted to the vehicle 100, e.g., a camera, LIDAR, and/or a radar sensor 130. Additionally or alternatively, the computer 110 may be programmed to receive the vehicle 100 sensor 130 data from a vehicle 100 motion sensor 130 including a steering sensor 130, a speed sensor 130, etc. The received data from a motion sensor 130 may include a physical attribute such as a speed, steering angle, etc.

The computer 110 may be programmed to identify and classify an object 180, e.g., using image processing techniques. In one example, the computer 110 may store class description information describing various classifications pertaining to one or more of vehicles, trailers, trucks, bicycles, etc. The stored classification description information may include information associated with each respective type, i.e., classification, of object 180. For example, the stored classification description information of each object type may include typical dimensions, shape, etc. of the respective object 180. For example, the classification or type of trailer object 180 may include dimensions and shapes of trailer objects 180. The classification or type description information may further include typical shape of hitch attachment 195. Additionally or alternatively, the classification description information may include typical location of a target area or point on each type of object 180. For example, the classification description of the trailer object 180 may identify a point on an end of a hitch attachment 195 as a target point 190c of the trailer 180. In the present disclosure, a target point 190c is a point that the vehicle 100 navigates the vehicle 100 to, as discussed below. Thus, the computer 110 may be programmed to identify the trailer object 180 based on the stored classification description and the received sensor data. For example, the computer 110 may be programmed to ignore a detected bicycle, upon determining that a request to attach the vehicle 100 to a trailer 180 is received, e.g., via the HMI 140.

The computer 110 may be programmed to determine a location of point 190c in the blind spot 160 based on the relationship of the one point 190c in the blind spot 160 to at least two points 190a, 190b of the object 180 within a field of view 135a, 135b of one or two object detection sensors 130a, 130b. The relationship of the points 190a, 190b, 190c may be geometrical relationships including parameters such as the distances L1, L2, L3 between the points 190a, 190b, 190c, and/or angles θ1, θ2, θ3 between sides of a triangle defined by the points 190a, 190b, 190c.

In one example, the computer 110 can identify the points 190a, 190b, 190c based on the received object detection sensor 130 data. For example, the computer 110 selects a point 190c on the hitch attachment 195 and selects the points 190a, 190b on edges of the trailer object 180, as shown in FIG. 1. The computer 110 may be programmed to determine Cartesian location coordinates of the points 190a, 190b, 190c relative to, e.g., the vehicle 100 reference point 125, from the received object detection sensor 130 data, and to determine the distances L1, L2, L3, and/or the angles θ1, θ2, θ3 based on the determined locations of the points 190a, 190b, 190c. Upon determining the distances L1, L2, L3, and/or the angles θ1, θ2, θ3, the computer 110 may be programmed to determine the location coordinates of the point 190c based on location coordinates of the points 190a, 190b which may be still within a field of view 135a, 135b, e.g., based on example equation (1). In the example equation (1), the function $f$ corresponds to the motion model of points 190a, 190b, 190c, as described above.

$$\begin{bmatrix} x_c \\ y_c \end{bmatrix} = f\left( \begin{bmatrix} x_a \\ y_a \end{bmatrix}, \begin{bmatrix} x_b \\ y_b \end{bmatrix} \right) \qquad (1)$$

With reference to example equation (1), the coordinates $x_a$, $y_a$, $x_b$, $y_b$, $x_c$, $y_c$ may specify coordinates of the points 190a, 190b, 190c on a ground surface in a two-dimensional (2D) Cartesian coordinate system having an origin at, e.g., the vehicle 100 reference point 125. In this example, the computer 110 may be programmed to navigate the vehicle 100 to the move the vehicle 100 hitch 150 to the location of the hitch attachment 195, e.g., the location of the point 195c. In this example, a height of the hitch 150 from the ground surface and a height of the hitch attachment 195 from the ground surface may be known to be aligned for mating the hitch 150 to the hitch attachment 195, e.g., based on a design of the vehicle 100 and/or the trailer object 180. Thus, the computer 110 may be programmed to estimate, using the equation (1), the 2D (two-dimensional) location coordinates $x_c$, $y_c$ of the point 190c based on location coordinates $x_a$, $y_a$, $x_b$, $y_b$ that are determined from object detection sensor 130 data, and to navigate the vehicle 100 based on the estimated location coordinates $x_c$, $y_b$, and the predetermined location coordinates of the vehicle 100 hitch 150 relative to the vehicle 100 reference point 125.

$$\begin{bmatrix} r \\ \varphi \end{bmatrix} = \begin{bmatrix} \sqrt{(x_3 - L_1\cos(\theta_1))^2 + (y_3 - L_1\sin(\theta_1))^2} \\ \tan^{-1}(y_3 - L_1\sin(\theta_1), x_3 - L_1\cos(\theta_1)) \end{bmatrix} \quad (i)$$

$$\begin{bmatrix} r \\ \varphi \end{bmatrix} = \begin{bmatrix} \sqrt{(x_3 - L_1\cos(\theta_1))^2 + (y_3 - L_1\sin(\theta_1))^2} \\ \tan^{-1}(y_3 - L_1\sin(\theta_1), x_3 - L_1\cos(\theta_1)) \end{bmatrix} \quad (ii)$$

$$H = \begin{bmatrix} \frac{\partial r}{\partial x_3} & \frac{\partial r}{\partial y_3} \\ \frac{\partial \varphi}{\partial x_3} & \frac{\partial \varphi}{\partial y_3} \end{bmatrix} \quad (iii)$$

As discussed above, location coordinates of a target point, e.g., the point 190c on the hitch 195, may be specified based on dimensions (e.g., length, width, etc.), angles, etc. of the shape defined by the selected n points 190. In one example, the computer 110 may be programmed based on equations (i) to (iii) to determine angular coordinates r and φ of the point 190c with reference to a reference point 125 and a reference line extending from the point 125 using the operations (i) to (iii). Equation (iii) shows a Jacobian matrix used for tracking the points, as discussed below.

Figure 2:
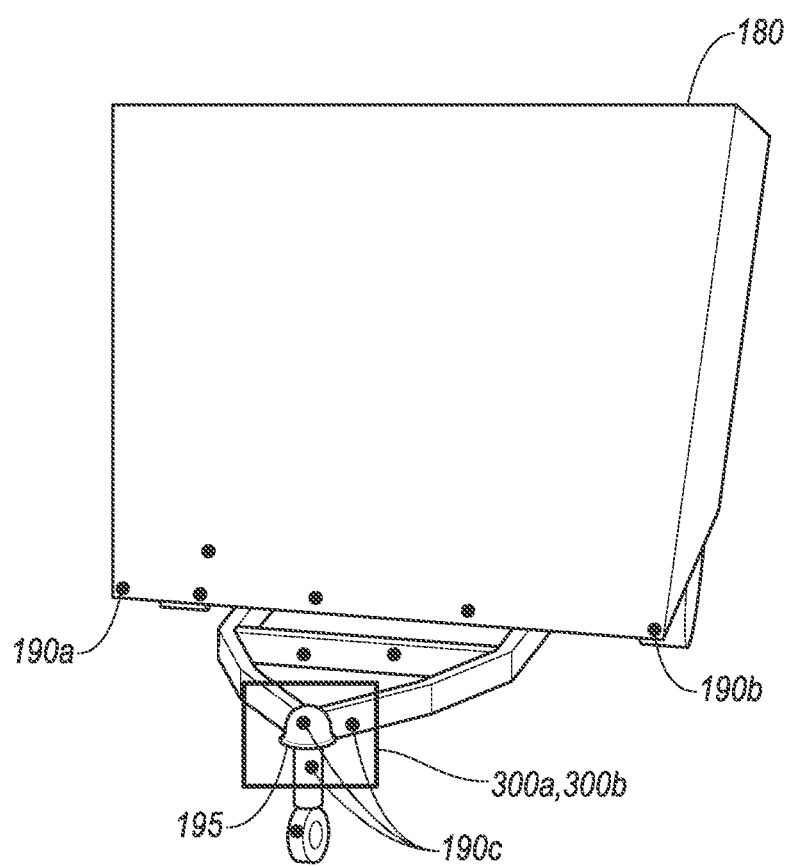
FIG. 2 is a block diagram showing a perspective view of the trailer captured by a vehicle sensor.

In example discussed above, the computer 110 is programmed to detect three points 190a, 190b, 190c which form a virtual triangular shape as shown in FIG. 1. In another example, shown in FIG. 2, the computer 110 may be programmed to determine more points on the object 180 (i.e., more than 3 points). Thus, the computer 110 may be programmed to define a shape based on interconnecting the points with virtual lines, and to determine any symmetrical shape, e.g., pyramid, hexagon, etc., and/or any asymmetrical shape based on a number and location of selected points on the object 180. The determined shape may be 2D when each of the selected points is in a same plane as other selected points, or a 3D (three dimensional) shape when at least one of the selected points is outside of a plane in which other selected points are located. The computer 110 may be programmed to determine dimensions and angles of the determined shape. For example, the computer 110 may be programmed to determine a pyramid shape based on selecting four points on the object including at least the point 195c on the hitch attachment 195. The determined shape from the selected points does not necessarily match a shape of the object 180. For example, the computer 110 may be programmed to determine a model such as shown in equation (2) to determine 3D location coordinates of the point 190c based on location coordinates of n points on the object 180. The function $f$ of the equation (2) may be specified based on dimensions, angles, etc. of the shape defined by the selected n points 190.

$$\begin{bmatrix} x_c \\ y_c \\ z_c \end{bmatrix} = f\left( \begin{bmatrix} x_1 \\ y_1 \\ z_1 \end{bmatrix}, \ldots, \begin{bmatrix} x_n \\ y_n \\ z_n \end{bmatrix} \right) \quad (2)$$

As discussed above, one or more of the points, e.g., the point 190c, may leave a field of view 135a, 135b and enter a blind spot 160. The computer 110 may be programmed to determine the location of the point 190c based on location of other points, e.g., the points 190a, 190b. In one example, to determine location of the points 190a, 190b, 190c, the computer 110 may be programmed to track the points 190a, 190b, 190c. As discussed above, the computer 110 receives object detection sensor 130 data from radar, LIDAR, camera sensors 130a, 130b, etc. Each of the object detection sensors 130 may have a different expected accuracy, i.e., amount of precision, with respect to certain one or more sensor 130 measurements. "Accuracy," (or precision) herein, means a measure of a deviation between an actual value of a physical parameter, e.g., speed, and a value of the physical parameter measured by a sensor 130. For example, in low light conditions, e.g., at night, a radar sensor 130a, 130b may operate more accurately (i.e., lower deviation between actual and measured coordinates) than a camera sensor 130a, 130b, whereas a camera sensor 130a, 130b has typically a higher precision than a radar sensor 130a, 130b in good light conditions, e.g., day light. Thus, with reference to equations (1) and (2), an inaccuracy of sensor 130 data may result in an inability to determine location coordinates of a point 190c. Thus, the computer 110 may be programmed to track the points 190a, 190b, 190c based on a combination of dead reckoning using motion sensor 130 data and/or determining location coordinates using object detection sensor 130 data.

The computer 110 may be programmed to determine the points 190a, 190b, 190c location based at least in part on last determined location (also known as dead reckoning) and/or based in part on location data received from vehicle 100 object detection sensors 130. As discussed above, the motion model may include (a) the relationship(s) of the location of the points 190a, 190b, 190c relative to one another, and expressions that describe a movement of the points 190a, 190b, 190c, based on a combination of data received from the vehicle 100 sensors 130 and/or dead reckoning. The dead reckoning may be based on vehicle 100 motion data, including a relationship of the points 190a, 190b, 190c of the object 180 relative to a vehicle 100 reference point 125. Motion data may include physical attributes of the vehicle including a speed, heading, and steering angle.

The computer 110 may be programmed to track the points 190a, 190b, 190c on the hitch attachment 195 of the object 180 based on at least one of dead reckoning and vehicle object detection sensor 130 data using a motion model. As an example, a motion model using an Extended Kalman Filter (EKF) is discussed herein. The computer 110 may be programmed to track the points 190a, 190b, 190c based on dead reckoning, e.g., when the received sensor 130 data fails to detect one or more of the points 190a, 190b, 190c, and/or data received from the sensor 130 is not acceptable, e.g., the received location coordinates are outside an expected uncertainty range (as discussed further below). Additionally or alternatively, the motion model may include any simultaneous localization and mapping (SLAM) model such as a particle filter, GraphSLAM, etc. Although, the tracking aspect of motion model, e.g., the EKF model, is discussed herein with respect to one point, but it is to be understood that the computer 110 can be programmed to track each of the points 190a, 190b, 190c using a motion model and to determine a location of a point 190c in the blind spot based on tracked location of other points 190a, 190b of the object 180 (based on motion model including geometrical relationship of the points 190a, 190b, 190c to one another).

The tracking model of the points 190a, 190b, 190c may include tracking based sensor 130 data. The tracking model may further include a dead reckoning model to estimate location of one or more of the points 190a, 190b, 190c based on a last detected location of the points 190a, 190b, 190c and the vehicle 100 motion data.

When it is determined that the received object detection sensor 130 data does not include locations of the points 190a, 190b, 190c, or is not acceptable (as discussed below), the computer 110 may be programmed to estimate the location of the points 190a, 190b, 190c using an EKF motion model based on motion sensor 130 data and last determined state of the object 180. Table 1 below shows parameters of an example EKF motion model.

TABLE 1

| Variable | Description |
|---|---|
| $\mu_t$ | Current state mean |
| $\bar{\mu}_t$ | Previous state propagated through motion model |
| $\Sigma_t$ | Current state covariance |
| G | Motion model Jacobian for state |
| V | Motion model Jacobian for motion data |
| $R_G$ | Trajectory uncertainty |
| $R_V$ | Motion data measurement uncertainty |

Figure 3:
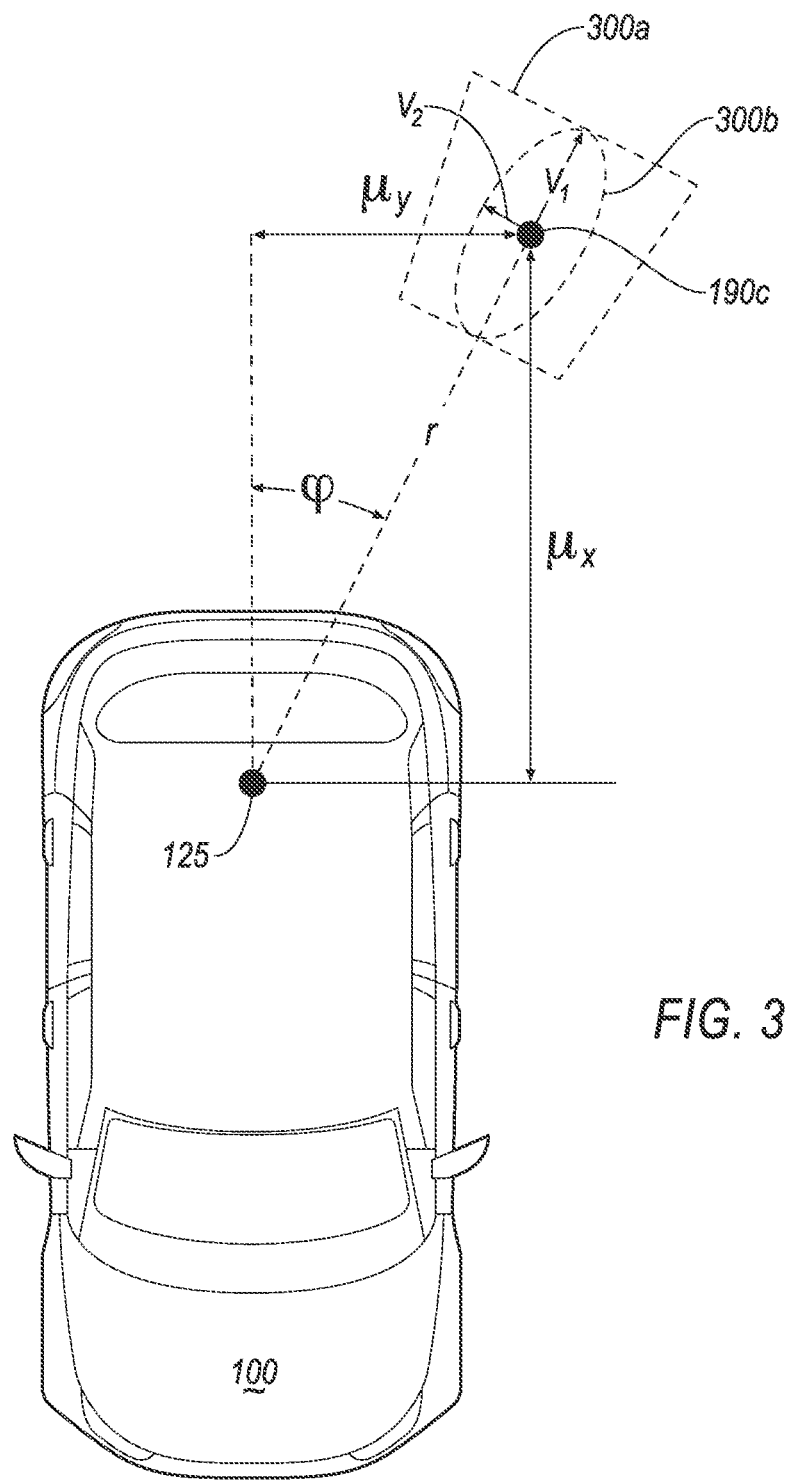
FIG. 3 is a top view of the vehicle of FIG. 1 and a point being tracking on a trailer hitch attachment.

With reference to FIG. 3, Table 1, and equations (3) and (4) (see below), the computer 110 may be programmed to estimate, for a time t, a state $\mu_t$ and covariance $\Sigma_t$ of the location of points based on vehicle 100 motion data including a speed and/or a yaw rate. The parameters $\mu_t$, $\mu_{t-1}$ represent values of the state $\mu$ at times t and t−1. Equation (5) shows an example definition of the state $\mu$ which includes two dimensional coordinates $\mu_x$, $\mu_y$ of the point 190c relative to a reference point 125 of the vehicle 100 (as coordinates system reference point) and an angular location $\phi$ of the point 190c relative to a vehicle 100 longitudinal axis. In one example, t and t−1 refer to two consecutive times when the computer 110 performs computation based on a motion model, e.g., 50 milliseconds (ms) apart based on a cyclic computation of the motion model.

The computer 110 may be programmed to determine the state $\mu$ covariance $\Sigma$ based on equation (4). The covariance $\Sigma$, in this context, is a statistical measure of correlation between motion data, e.g., speed $V_c$, yaw rate $\psi$, etc., and changes in the state $\mu$. The operator shown as a superscript T, e.g., $G^T$, is a transpose operation which flips a matrix over its diagonals.

$$\mu_t = \mu_{t-1} + \bar{\mu}_t \quad (3)$$

$$\Sigma_t = G\left(\sum_t + R_G\right)G^T + VR_V V^T \quad (4)$$

$$\mu = \begin{bmatrix} \mu_x \\ \mu_y \\ \phi \end{bmatrix} \quad (5)$$

In order to determine the state $\mu$ using dead reckoning, as shown in equation (3), the computer 110 may be programmed to determine a state $\mu_t$ of the point 190c at a time t by propagating the last state $\mu_{t-1}$ through the motion model as shown in example equation (6) using, e.g., the Ackerman steering model, to determine a change $\bar{\mu}_t$ of the state $\mu$, and to add the change $\bar{\mu}_t$ relative to the last state $\mu_{t-1}$. In other words, the computer 110 estimates a change $\bar{\mu}$ of the state $\mu$ based on vehicle 100 motion data, e.g., vehicle 100 speed $V_c$, and a yaw rate $\psi$. $\Delta T$, in equation (6) represents a time different between two states $\mu_t$ and $\mu_{t-1}$, e.g., 50 ms.

$$\bar{\mu}_t = \begin{bmatrix} \Delta x \\ \Delta y \\ \Delta \phi \end{bmatrix} = \begin{bmatrix} \frac{V_c}{\psi}(-\sin(\phi) + \sin(\phi + \psi\Delta T)) \\ \frac{V_c}{\psi}(-\cos(\phi) - \cos(\phi + \psi\Delta T)) \\ \psi\Delta T \end{bmatrix} \quad (6)$$

$$G = \begin{bmatrix} \frac{\partial \Delta x}{d\mu_{(t-1)x}} & \frac{\partial \Delta x}{d\mu_{(t-1)y}} \\ \frac{\partial \Delta y}{d\mu_{(t-1)x}} & \frac{\partial \Delta y}{d\mu_{(t-1)y}} \end{bmatrix} \quad (7)$$

$$V = \begin{bmatrix} \frac{\partial \Delta x}{dV_{c,t}} & \frac{\partial \Delta x}{d\psi_t} \\ \frac{\partial \Delta y}{dV_{c,t}} & \frac{\partial \Delta y}{d\psi_t} \end{bmatrix} \quad (8)$$

Using equations (7) and (8), the computer 110 may be programmed to determine a Jacobian matrix G for the state $\mu$, and a Jacobian matrix V for the motion data. The Jacobian matrix G includes partial derivatives of the motion $\Delta x$ and $\Delta y$ with respect to the state variables $\mu_{(t-1)x}$, $\mu_{(t-1)y}$. The Jacobian matrix V includes partial derivatives of the motion $\Delta x$ and $\Delta y$ with respect to the motion data, e.g., the vehicle 100 speed $V_c$ and yaw rate $\psi$. Table 2 shows parameters pertaining to updating the state based on received sensor 130 data.

TABLE 2

| Variable | Description |
|---|---|
| K | Kalman gain matrix |
| H | Measurement model Jacobian w.r.t. state |
| Q | Measurement noise |
| z | Current measurement |
| $\hat{z}$ | Expected measurement |

As discussed above, the computer 110 may be programmed to track the points 190a, 190b, 190c by dead reckoning using motion sensor data, as discussed with reference to equations (3)-(8), and/or updating the location coordinates using object detection sensor 130 data, e.g., data received from radar sensor 130a, 130b, camera sensor 130a, 130b, etc. In one example, with reference to Tables 1-2 and equations (9)-(11), the computer 110 may be programmed to update the state $\mu$ based on received data from radar, camera, etc. sensors 130a, 130b. The measurement noise Q represents noise included in sensor 130 data. The measurement noise Q may vary based on a sensor 130 type. For example, the measurement noise Q of a radar sensor 130a, 130b is typically different compared to measurement noise Q of a camera sensor 130a, 130b. The measurement noise Q for the sensors 130a, 130b may be determined using empirical methods. For example, a target point may be moved within the field of view 135a, 135b of a sensor 130a, 130b and the measurement noise Q may be determined by comparing the received sensor 130a, 130b data to ground truth data, e.g., known location coordinates of the target point at any time. Parameters z, ẑ represent (a) determined location coordinates based on received sensor data and (b) the location coordinates estimated based on dead reckoning, respectively. Equation (9) shows how a gain matrix K is computed. As shown in equation (10), the gain matrix K is applied as a multiplier to a difference between a measured sensor value z and an expected sensor value ẑ, which is determined based on dead reckoning, in order to determine a new state $\mu_t$. Equation (11) shows how a new state covariance $\Sigma_t$ is determined. The matrix I is an identity matrix of a same dimensions as $\Sigma_{t-1}$.

$$K = \Sigma_{t-1} H (H \Sigma_{t-1} H^T + Q)^{-1} \quad (9)$$

$$\mu_t = \mu_{t-1} + K(z - \hat{z}) \quad (10)$$

$$\Sigma_t = (1 - KH) \Sigma_{t-1} \quad (11)$$

However, as discussed above, the object detection sensor 130a, 130b data may be unacceptable because of accuracy, e.g., a blurry image received from a camera sensor 130a, 130b at night time. For example, the computer 110 may detect a different point as the point 190b due to camera sensor 130a, 130b inaccuracy caused by low light conditions. Thus, the computer 110 may be programmed to determine whether to accept the received object detection sensor 130a, 130b data. "Accept," in this context means to receive and use the received data as an input for tracking the points 190a, 190b, 190c. Upon determining that the received object detection sensor 130a, 130b data is acceptable, the computer 110 may be programmed to update the state $\mu$ based on the received object detection sensor 130a, 130b data. In one example, the computer 110 may be programmed to determine whether the received data from the object detection sensor 130a, 130b is acceptable by determining a distribution range such as an example range 300a, 300b shown in FIG. 3. In one example, the computer 110 may be programmed to determine a trapezoidal shaped range 300a based on an angular range, e.g., between 30 and 40 degrees, and a linear range, e.g., between 200 and 210 centimeters, from the reference point 125. In another example, the computer 110 may be programmed to determine a circular or ellipse-shaped range 300b based on a mean value of the state $\mu$, and the covariance $\Sigma$. For example, the range 300b may be a circle centered at the mean value of state $\mu$, and a radius derived from the covariance $\Sigma$. The term "mean," in the present context is a statistical measure that represents a central tendency of the data, e.g., an average value. A "central tendency," as is known in the field of statistics, is a central or typical value for a probability distribution. A central tendency may also be referred to as a center or location of the distribution. A range 300a, 300b, in the present context, is an area where a tracked point 190a, 190b, 190c is expected to be, e.g., a gaussian distribution range 300a, 300b.

In one example, the ranges 300a, 300b may be different for different types of sensors 130a, 130b. For example, the computer 110 typically receives polar coordinates from a radar sensor 130, i.e., coordinates including a linear distance and an angle relative to a reference point 125 and a line of origin, e.g., a longitudinal axis of the vehicle 100. Thus, the computer 110 may be programmed to perform a transformation of measurements between the Cartesian coordinate system and the polar coordinate system, as shown in equation (12), and to determine the Jacobian matrix H for the radar sensor 130a, 130b data based on equation (13).

$$\begin{bmatrix} r \\ \varphi \end{bmatrix} = \begin{bmatrix} \sqrt{\mu_x^2 + \mu_y^2} \\ \operatorname{atan2}(\mu_y, \mu_x) \end{bmatrix} \quad (12)$$

$$H = \begin{bmatrix} \frac{\partial r}{\partial \mu_x} & \frac{\partial r}{\partial \mu_y} \\ \frac{\partial \varphi}{\partial \mu_x} & \frac{\partial \varphi}{\partial \mu_y} \end{bmatrix} = \begin{bmatrix} \frac{\mu_x}{\sqrt{\mu_x^2 + \mu_y^2}} & \frac{\mu_y}{\sqrt{\mu_x^2 + \mu_y^2}} \\ -\frac{\mu_y}{\mu_x^2 + \mu_y^2} & \frac{\mu_x}{\mu_x^2 + \mu_y^2} \end{bmatrix} \quad (13)$$

$$D = \sqrt{(z - \mu) \Sigma^{-1} (z - \mu)^T} \quad (14)$$

In one example, based on equation (14), the computer 110 may be programmed to determine a length of an ellipse-shaped range 300b for received radar sensor 130 data by determining a Mahalanobis distance D representing an Euclidean distance of each measurement, z, from the mean of the state $\mu$. With reference to FIG. 3, a contour of range 300b may be determined based on the Mahalanobis distance D. For example, any point on the contour of the range 300b may have a distance from the vehicle 100 reference point 125 that is equal to the Mahalanobis distance D.

In another example, the range 300b may be ellipse-shaped and defined based on the covariance $\Sigma$ and the mean of the state $\mu$. Equation (15) shows a mathematical definition of the covariance $\Sigma$. Parameters $\sigma_x$ and $\sigma_y$ are standard deviations of the error (inaccuracy) defining semi-major and semi-minor axes of the ellipse shaped range 300b that surrounds the mean of state $\mu$ in, e.g., a Gaussian distribution. In other words, the ellipse shaped range 300b may be defined by a center point at the mean of state $\mu$, dimensions of semi-major and semi-minor based on parameters $\sigma_x$ and $\sigma_y$.

$$\Sigma = \begin{bmatrix} \sigma_x^2 & \sigma_x \sigma_y \\ \sigma_y \sigma_x & \sigma_y^2 \end{bmatrix} \quad (15)$$

$$\Sigma = \begin{bmatrix} 3 & 2 \\ 2 & 3 \end{bmatrix} \quad (16)$$

$$V_1 = \begin{bmatrix} V_{1x} \\ V_{1y} \end{bmatrix} = \begin{bmatrix} -0.707 \\ 0.707 \end{bmatrix} \quad (17)$$

$$V_2 = \begin{bmatrix} V_{2x} \\ V_{2y} \end{bmatrix} = \begin{bmatrix} 0.707 \\ 0.707 \end{bmatrix} \quad (18)$$

$$\theta_{minor} = \operatorname{atan2}(V_{1y}, V_{1x}) = \operatorname{atan2}(0.707, -0.707) = 135 \text{ degrees} \quad (19)$$

$$\theta_{major} = \operatorname{atan2}(V_{2y}, V_{2x}) = \operatorname{atan2}(0.707, 0.707) = 45 \text{ degrees} \quad (20)$$

With reference to FIG. 3, the computer 110 may be programmed to determine angles $\theta_{minor}$, $\theta_{major}$ of semi-minor and/or semi-major axes (relative to a reference line extending from the vehicle 100 reference point 125 or a line parallel thereto) of the ellipse-shaped range 300b based on eigenvectors $V_1$ and $V_2$ of the covariance $\Sigma$. The eigenvectors $V_1$, $V_2$ indicate directions of the semi-major and semi-minor axes of the ellipse-shaped range 300b, as shown in FIG. 3. For example, with reference to equations (16) to (18), the computer 110 may be programmed to determine the eigenvectors $V_1$ and $V_2$ based on an example covariance of equation (16). With reference to equations (19) and (20), the computer 110 may be programmed to determine the angles $\theta_{minor}$, $\theta_{major}$ in units of degrees (or radians) relative to a reference line extending from the vehicle 100 reference point 125. For example, a value 0 (zero) degrees for angles $\theta_{minor}$, $\theta_{major}$ means a semi-minor or semi-major is parallel to the reference line extending from the vehicle 100 reference point 125. An operation a tan 2(y, x) returns an arc tangent of variables x and y.

Processing

Figure 4:
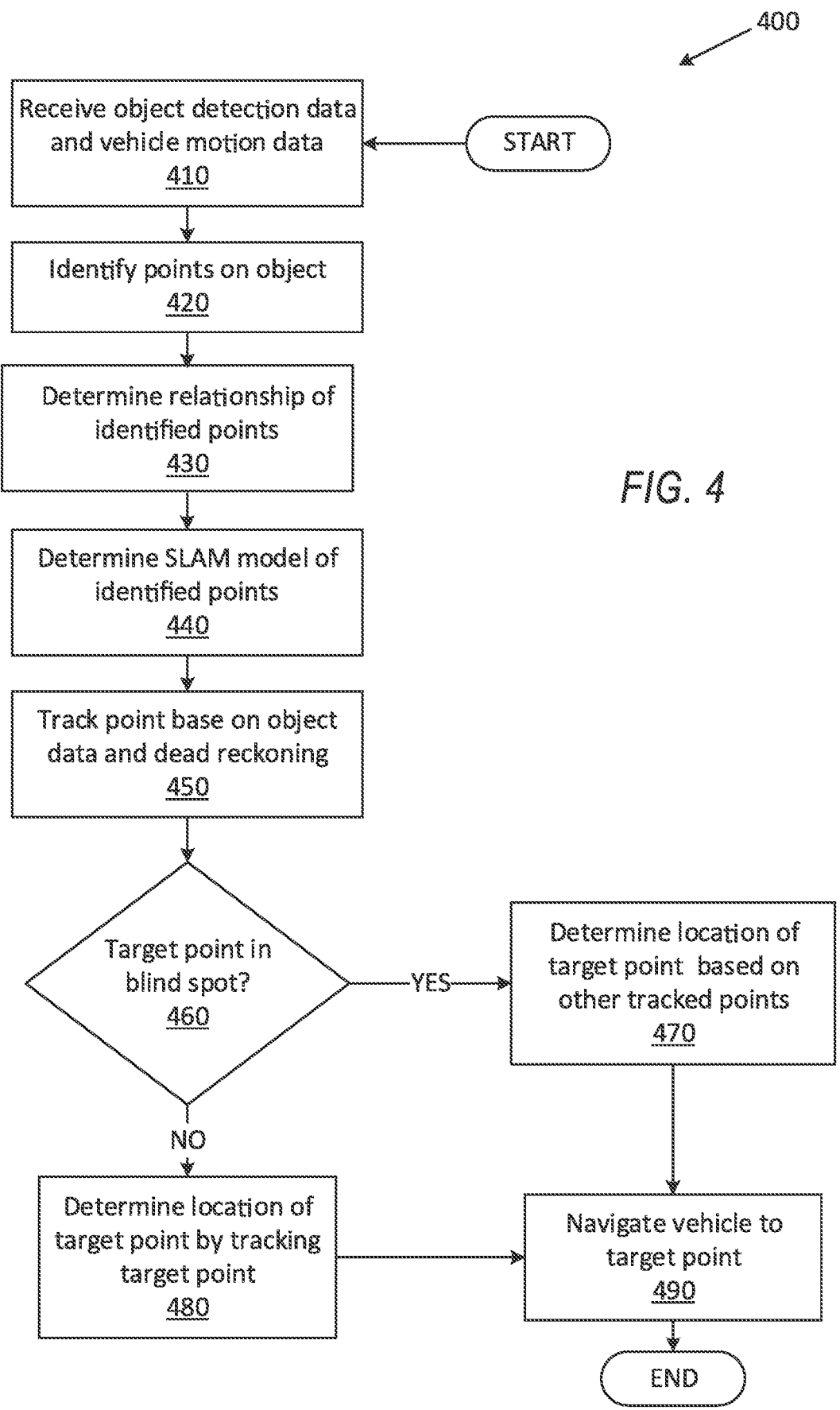
FIG. 4 is a flowchart of an exemplary process for tracking the point of FIG. 3 and navigating a vehicle hitch to the trailer hitch attachment.

FIG. 4 is a flowchart of an exemplary process 400 for tracking a point on the trailer 180 hitch attachment 195 and navigating the vehicle 100 hitch 150 to the trailer 180 hitch attachment 195. The computer 110 may be programmed to execute blocks of the process 400.

The process 400 begins, in a block 410, in which the computer 110 receives sensor 130 data including vehicle 100 motion data and object detection data. The computer 110 may be programmed to receive motion data, e.g., steering angle, speed, etc., from vehicle 100 steering angle sensor 130, speed sensor 130, etc. The computer 110 may be programmed to receive the object detection data from the vehicle 100 object detection sensors 130a, 130b, e.g., camera sensor 130a, 130b, radar sensors 130a, 130b, etc.

Next, in a block 420, the computer 110 identifies points 190a, 190b, 190c on an object 180 exterior to the vehicle 100. The computer 110 may be programmed to identify points 190a, 190b, 190c on a trailer object 180, e.g., points 190a, 190b on corners of the trailer object 180 and a target point 190c on a trailer 180 hitch attachment 195. The computer 110 may be programmed to identify the points 190a, 190b, 190c based on received object detection data.

Next, in a block 430, the computer 110 determines relationship(s) of the identified points 190a, 190b, 190c. The computer 110 may be programmed to define a virtual shape based on the identified points 190a, 190b, 190c, and to determine the distances L1, L2, L3, and/or the angles θ1, θ2, θ3 of the defined shape (see FIG. 1). The computer 110 may be programmed to determine a motion model including geometrical relationships of the points 190a, 190b, 190c based on the defined shape and the determined distances L1, L2, L3, and/or the angles θ1, θ2, θ3.

Next, in a block 440, the computer 110 determines a SLAM motion model such as an EKF model as a part of the motion model for tracking the location of the points 190a, 190b, 190c. The SLAM motion model may include a tracking model based on received object detection sensor data and dead reckoning based on received vehicle 100 motion data.

Next, in a block 450, the computer 110 tracks the points 190a, 190b, 190c based on received sensor 130 data and dead reckoning. The computer 110 may be programmed to track the location(s) of the points 190a, 190b, 190c by (a) estimating the locations using dead reckoning based on the vehicle 100 motion data, and/or (b) determining the locations based on received object detection sensor data.

Next, in a decision block 460, the computer 110 determines whether a target point 190c is within a blind spot 160. If the computer 110 determines that the target point 190c, e.g., on the hitch attachment 195, is in the blind spot 160 of the vehicle 100 object detection sensors 130a, then the process 400 proceeds to a block 470; otherwise the process 400 proceeds to a block 480.

In the block 470, the computer 110 determines the location of the target point 190c based on determined locations of other tracked points, e.g., the points 190a, 190b. The computer 110 may be programmed to determine the location of the points 190a, 190b based on the SLAM motion model and the received sensor data. The computer 110 may be further programmed to estimate the location of the point 190c within the blind spot based on the geometrical relationship of the point 190c to other tracked points 190a, 190b. Following the block 470, the process 400 proceeds to a block 490.

In the block 480, the computer 110 determines the location of the target point 190c by tracking the target point 190c based on received sensor data. The computer 110 may be programmed to track the point 190c within the fields of view 135a, 135b based on object detection data and dead reckoning. Following the block 480, the process 400 proceeds to the block 490.

In the block 490, the computer 110 navigates the vehicle 100 to the target point 190c. The computer 110 may be programmed to actuate a vehicle 100 propulsion, steering, and/or braking actuator 120 to move the vehicle 100 hitch 150 location to the location of the point 190c on the hitch attachment 195. Following the block 490, the process 400 ends, or alternatively returns to the block 410.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a processor and a memory, the memory storing instructions executable by the processor to:
   identify an object, including points on the object based on image data received from vehicle sensors;
   perform tracking of the object based on a motion model including a relationship of the points on the object to one another;
   determine a location of one of the points in a blind spot based on the relationship of the one of the points in the blind spot to at least two points of the points on the object within a field of view of one or two vehicle sensors, wherein the blind spot is a space outside fields of view of the vehicle sensors; and
   then output the determined location of the one of the points in the blind spot.

2. The system of claim 1, wherein the motion model further includes a dead reckoning model, based on vehicle motion data, including a second relationship of the points to a vehicle reference point.

3. The system of claim 2, wherein instructions further include instructions to track the points of the object based on at least one of dead reckoning and vehicle object detection sensor data.

4. The system of claim 1, wherein fields of view of one or more vehicle sensors at least partially overlap.

5. The system of claim 1, wherein instructions further include instructions to identify three-dimensional location coordinates of each of the points relative to a reference point in a vehicle.

6. The system of claim 1, wherein the object is a trailer including a hitch attachment, and the instructions further include instructions to navigate a vehicle by actuating one or more vehicle actuators to move a vehicle hitch to a location of the hitch attachment of the trailer.

7. The system of claim 1, wherein instructions further include instructions to track the points further based on physical attributes of a vehicle including a speed, heading, and steering angle.

8. A method, comprising:
   identifying an object, including points on the object based on image data received from vehicle sensors;
   performing tracking of the object based on a motion model including a relationship of the points on the object to one another;
   determining a location of one of the points in a blind spot based on the relationship of the one of the points in the blind spot to at least two points of the points on the object within a field of view of one or two vehicle sensors, wherein the blind spot is a space outside fields of view of the vehicle sensors; and
   then outputting the determined location of the one of the points in the blind spot.

9. The method of claim 8, wherein the motion model further includes a dead reckoning model, based on vehicle motion data, including a second relationship of the points of the object relative to a vehicle reference point.

10. The method of claim 9, further comprising tracking the points of the object based on at least one of dead reckoning and vehicle sensor data.

11. The method of claim 8, wherein fields of view of one or more vehicle sensors at least partially overlap.

12. The method of claim 8, wherein tracking the points further includes identifying three-dimensional location coordinates of each of the points relative to a reference point in a vehicle.

13. The method of claim 8, wherein the object is a trailer including a hitch attachment, the method further comprising navigating a vehicle by actuating one or more vehicle actuators to move a vehicle hitch to a location of the hitch attachment of the trailer.

14. A system, comprising:
   means for identifying an object, including points outside a vehicle blind spot, from vehicle sensor data;
   means for performing tracking the object based on a motion model including a relationship of the points on the object to one another;
   means for determining the location of the one of the points in the blind spot based on the relationship of the one of the points in the blind spot to at least two points of the points on the object within a field of view of one or two object detection sensors; and
   means for then outputting a location of one of the points in the blind spot based on the tracking.

15. The system of claim 14, wherein the motion model further includes a dead reckoning model, based on vehicle motion data, including a second relationship of the points of the object relative to a vehicle reference point.

* * * * *